(12) United States Patent
Norling et al.

(10) Patent No.: US 11,873,755 B2
(45) Date of Patent: Jan. 16, 2024

(54) PISTON, INTERNAL COMBUSTION ENGINE, AND VEHICLE

(71) Applicant: Scania CV AB, Södertälje (SE)

(72) Inventors: Daniel Norling, Huddinge (SE); Elin Eriksson, Hägersten (SE)

(73) Assignee: Scania CV AB, Södertälje (SE)

(*) Notice: Subject to any disclaimer, the term of this patent is extended or adjusted under 35 U.S.C. 154(b) by 0 days.

(21) Appl. No.: 17/999,435

(22) PCT Filed: May 25, 2021

(86) PCT No.: PCT/SE2021/050490
§ 371 (c)(1),
(2) Date: Nov. 21, 2022

(87) PCT Pub. No.: WO2021/242165
PCT Pub. Date: Dec. 2, 2021

(65) Prior Publication Data
US 2023/0279803 A1    Sep. 7, 2023

(30) Foreign Application Priority Data
May 27, 2020 (SE) .................... 2050608-5

(51) Int. Cl.
*F02B 23/06* (2006.01)
*F02F 3/28* (2006.01)

(52) U.S. Cl.
CPC ...... *F02B 23/0648* (2013.01); *F02B 23/0672* (2013.01); *F02F 3/28* (2013.01)

(58) Field of Classification Search
CPC ...... F02B 23/0648; F02B 23/0672; F02F 3/28
USPC .................... 123/298, 307, 193.6
See application file for complete search history.

(56) References Cited

U.S. PATENT DOCUMENTS

| | | | | |
|---|---|---|---|---|
| 2,709,992 A | * | 6/1955 | Graves | F02B 3/00 123/263 |
| 8,555,854 B2 | * | 10/2013 | Rothbauer | F02B 23/0651 123/285 |
| 9,429,065 B2 | * | 8/2016 | Zoeller | F02B 23/0669 |
| 10,215,082 B2 | | 2/2019 | Richard et al. | |
| 10,233,864 B2 | * | 3/2019 | Yu | F02F 3/24 |

(Continued)

FOREIGN PATENT DOCUMENTS

| | | |
|---|---|---|
| CN | 102155326 A | 8/2011 |
| DE | 102007013244 A1 | 9/2008 |
| EP | 0651151 A1 | 5/1995 |

(Continued)

OTHER PUBLICATIONS

Jun. 7, 2021—(WO) International Search Report & Written Opinion—App. No. PCT/SE2021/050490.

(Continued)

*Primary Examiner* — Hai H Huynh
(74) *Attorney, Agent, or Firm* — Banner & Witcoff, Ltd.

(57) ABSTRACT

A piston for an internal combustion engine is disclosed. The piston comprises a number of fuel directing surfaces for directing a fuel spray sprayed onto the fuel directing surface. At least one of the fuel direction surfaces is/are inclined relative to a tangential direction of the piston. The present disclosure further relates to an engine comprising a piston and a vehicle comprising an internal combustion engine.

18 Claims, 4 Drawing Sheets

(56) References Cited

U.S. PATENT DOCUMENTS

2008/0142622 A1    6/2008  Gray

FOREIGN PATENT DOCUMENTS

| JP | S51151803 U | 12/1976 |
| JP | S6293126 U | 6/1987 |
| JP | H1162591 A | 3/1999 |
| WO | 2015071093 A1 | 5/2015 |

OTHER PUBLICATIONS

Dec. 14, 2020—(SE) Office Actio—App. No. 2050608-5.
Jun. 3, 2021—(SE) Office Action—App. No. 2050608-5.
Dec. 10, 2019—(SE) Technology Search Report—App. No. 2050608-5.

* cited by examiner

PISTON, INTERNAL COMBUSTION ENGINE, AND VEHICLE

CROSS-REFERENCE TO RELATED APPLICATIONS

The present application claims priority from and is a U.S. National Phase of International Application No. PCT/SE2021/050490, which was filed on May 25, 2021, designating the United States of America and claiming priority to Swedish Patent Application No. 2050608-5, filed on May 27, 2020. This application claims priority to and the benefit of the above-identified applications, which are all fully incorporated by reference herein in their entireties.

TECHNICAL FIELD

The present disclosure relates to a piston for an internal combustion engine. The present disclosure further relates to an internal combustion engine comprising a cylinder and a piston configured to reciprocate in the cylinder. Furthermore, the present disclosure relates to a vehicle comprising an internal combustion engine.

BACKGROUND

Internal combustion engines, such as four-stroke internal combustion engines, comprise one or more cylinders and a piston arranged in each cylinder. The pistons are connected to a crankshaft of the engine and are arranged to reciprocate within the cylinders upon rotation of the crankshaft. The engine usually further comprises one or more inlet valves and outlet valves as well as one or more fuel supply arrangements. The one or more inlet valves and outlet valves are controlled by a respective valve control arrangement usually comprising one or more camshafts rotatably connected to a crankshaft of the engine, via a belt, chain, gears, or similar. A four-stroke internal combustion engine completes four separate strokes while turning the crankshaft. A stroke refers to the full travel of the piston along the cylinder, in either direction. The uppermost position of the piston in the cylinder is usually referred to as the top dead centre TDC, and the lowermost position of the piston in the cylinder is usually referred to as the bottom dead centre BDC. The strokes are completed in the following order, inlet stroke, compression stroke, expansion stroke and exhaust stroke.

Compression ignition engines, such as diesel engines, comprise a fuel injector arranged in each cylinder of the engine. Moreover, many modern spark ignition engines, such as gasoline engines, comprise a fuel injector arranged in each cylinder of the engine. These types of engines are usually referred to as direct injection engines. The fuel injector usually comprises a number of orifices and a needle configured to control flow of fuel through the orifices. The fuel injector is usually controlled to inject fuel into the cylinder towards the end of the compression stroke of the current cylinder. Somewhat conical fuel sprays are formed in the cylinder when fuel is sprayed into the cylinder via the orifices.

Fuel consumption is a main concern for internal combustion engines. Two ways of improving the fuel efficiency of an engine is to reduce the transfer of heat to walls of the combustion chamber and to increase the combustion heat release. However, these requirements are normally conflicting requirements. That is, when increasing the combustion heat release, the transfer of heat to walls of the combustion chamber is normally increased, and vice versa.

Combustion heat release is a measure of burn rate, i.e. the rate at which the fuel is burning, and can be improved by improving the mixing rate between air and the fuel. Improving the mixing rate is normally done by optimizing inlet swirl motion in the cylinder. However, this method has limitations.

Moreover, when injecting a fuel spray into a cylinder, a stoichiometric zone is formed around the fuel spray. In this zone, there is a stoichiometric ratio between fuel and air. Such a zone is sometimes referred to as a stoichiometric surface area of the fuel spray. Stoichiometric combustion is advantageous for the heat release and the fuel efficiency of the engine. However, fuel nozzles and combustion chambers of engines put limitations on the size of the stoichiometric surface area.

SUMMARY

It is an object of the present invention to overcome, or at least alleviate, at least some of the above-mentioned problems and drawbacks.

According to a first aspect of the invention, the object is achieved by a piston for an internal combustion engine. The piston comprises a number of fuel directing surfaces for directing a fuel spray sprayed onto the fuel directing surface. At least one of the fuel direction surfaces is/are inclined relative to a tangential direction of the piston.

Since at least one of the fuel direction surfaces is/are inclined relative to a tangential direction of the piston, a fuel spray being angled relative to the tangential direction of the piston is obtained after being directed by the fuel direction surface. Thereby, merging between the fuel spray and adjacent fuel sprays can be avoided. As a result, the total stoichiometric surface area of fuel sprays can be increased which in turn increases the heat release and the fuel efficiency of an engine comprising the piston.

In addition, since each fuel directing surface is configured to direct a fuel spray sprayed onto the fuel directing surface, each fuel spray is obtaining a more flattened cross section after having been directed by a fuel direction surface. That is, somewhat conical fuel sprays are formed in a cylinder when fuel is sprayed freely into a cylinder via orifices of an injector. Conical fuel sprays have a circular cross section in a direction perpendicular to the spraying direction. However, since each fuel directing surface is configured to direct a fuel spray sprayed onto the fuel directing surface, more flattened fuel sprays are provided after the impact between the fuel sprays and the respective fuel directing surface. The flattened fuel sprays have a more elliptical cross section in a direction perpendicular to the spraying direction than a conical fuel spray.

Accordingly, the flattened fuel sprays have a greater surface to volume ratio than a conical fuel spray which provides a greater surface area for mixing of air and fuel. Consequently, the flattened fuel sprays have a greater stoichiometric surface area of the fuel spray than a conical fuel spray. As a result thereof, a piston is provided having conditions for improving the combustion heat release without significantly affecting the heat transfer to walls of a combustion chamber. Accordingly, also for this reason, a piston is provided having conditions for improving the fuel efficiency of an engine.

Accordingly, a piston is provided overcoming, or at least alleviating, at least some of the above-mentioned problems and drawbacks. As a result, the above-mentioned object is achieved.

Optionally, the fuel directing surfaces are arranged at a distance from a top surface of the piston measured along a centre axis of the piston. Thereby, conditions are provided for an efficient flow of air into fuel sprays from the areas between the top surface of the piston and the trailing edges of the fuel directing surfaces. In this manner, the mixing rate between the air and the fuel can be increased which in turn increases the heat release and the fuel efficiency of an engine comprising the piston.

Optionally, the piston comprises a piston bowl, and wherein the number of fuel directing surfaces are arranged in the piston bowl. Thereby, a piston is provided capable of directing fuel sprays into the piston bowl of the piston while avoiding merging between fuel sprays. Thus, a piston is provided having conditions for improving the combustion heat release without significantly affecting the heat transfer to walls of a combustion chamber.

Optionally, the number of fuel directing surfaces are distributed around a centre axis of the piston. Thereby, a piston is provided capable of directing fuel sprays into a combustion chamber in a uniform and well distributed manner, while avoiding merging between fuel sprays. Thereby, conditions are provided for an improved air/fuel mixing rate and thus also an improved combustion heat release. Moreover, conditions are provided for relative short distances between orifices of an injector and the fuel directing surfaces. Thereby, conditions are provided for reducing the interaction between flames and walls of a combustion chamber, and thus also the heat transfer to walls of a combustion chamber, which has a negative impact on the fuel efficiency of an engine.

Optionally, the piston comprises a central protrusion protruding from a top surface of the piston at a position between the number of fuel direction surfaces. Thereby, a piston is provided capable of obtaining a high compression ratio in a cylinder, and/or providing conditions for a larger piston bowl without reducing the compression ratio in a cylinder.

Optionally, the central protrusion is conical or frusto-conical. Thereby, an efficient structure is provided capable of obtaining a high compression ratio in a cylinder while allowing fuel sprays to be located adjacent to sides of the central protrusion. Thereby, the available space in a combustion chamber of an engine comprising the piston can be utilized in an efficient manner.

Optionally, an inclination angle between at least one fuel direction surface and the tangential direction of the piston is within the range of 1-45 degrees or is within the range of 7-21 degrees. Thereby, merging between the fuel spray and adjacent fuel sprays can be avoided in an efficient manner. As a result, the total stoichiometric surface area of fuel sprays can be increased in an efficient manner which in turn increases the heat release and the fuel efficiency of an engine comprising the piston.

Optionally, each fuel directing surface of the number of fuel directing surfaces is inclined relative to a tangential direction of the piston. Thereby, fuel sprays being angled relative to tangential directions of the piston are obtained after these have been directed by the fuel direction surfaces. Thereby, merging between the fuel sprays can be further avoided. As a result, the size of the total stoichiometric surface area of fuel sprays can be further optimized so as to increase the heat release and the fuel efficiency of an engine comprising the piston.

Optionally, the fuel directing surfaces are inclined in the same direction relative to tangential directions of the piston. Thereby, merging between adjacent fuel sprays can be further avoided. As a result, the size of the total stoichiometric surface area of fuel sprays can be further increased which in turn increases the heat release and the fuel efficiency of an engine comprising the piston.

Optionally, the number of fuel directing surfaces are provided with the same inclination angle relative to tangential directions of the piston. Thereby, merging between adjacent fuel sprays can be further avoided. As a result, the total stoichiometric surface area of fuel sprays can be increased which in turn increases the heat release and the fuel efficiency of an engine comprising the piston.

Optionally, the radial distances from a centre axis of the prison to trailing edges of the fuel directing surfaces is within the range of 20%-70% of the radius of the piston, or is within the range of 25%-55% of the radius of the piston. Thereby, conditions are provided for relative short distances between orifices of an injector and the fuel directing surfaces. Thereby, conditions are provided for reducing the interaction between flames and walls of a combustion chamber, and thus also the heat transfer to walls of a combustion chamber.

Optionally, the distances between trailing edges of the fuel direction surfaces and the top surface of the piston adjacent to the trailing edges, measured along the centre axis, is within the range of 2%-25% of the radius of the piston or is within the range of 4%-11% of the radius of the piston. Thereby, conditions are provided for an efficient flow of air into fuel sprays from the areas between the top surface of the piston and the trailing edges of the fuel directing surfaces. In this manner, the mixing rate between the air and the fuel can be increased which in turn increases the heat release and the fuel efficiency of an engine comprising the piston.

Optionally, the fuel directing surfaces are arranged with gaps between two adjacent fuel directing surfaces. Since the fuel directing surfaces are arranged with gaps between two adjacent fuel directing surfaces, air can flow through the gaps into fuel sprays directed by the fuel directing surfaces. In this manner, a further improved mixing rate between air and fuel is provided. Thereby, a piston is provided having conditions for improving the combustion heat release without significantly affecting the heat transfer to walls of a combustion chamber. Accordingly, a piston is provided having conditions for improving the fuel efficiency of an engine.

Optionally, the piston is a piston for a compression ignition engine. Thereby, a piston for a compression ignition engine is provided having conditions for increasing the total stoichiometric surface area of fuel sprays. Accordingly, a piston is provided having conditions for improving the fuel efficiency of a compression ignition engine.

According to a second aspect of the invention, the object is achieved by an internal combustion engine comprising a cylinder, and a piston according to some embodiments of the present disclosure. The piston is configured to reciprocate in the cylinder.

Since the internal combustion engine comprises a piston according to some embodiments, an engine is provided having conditions for increased total stoichiometric surface area of fuel sprays. Accordingly, an internal combustion engine is provided having conditions for improved fuel efficiency.

Accordingly, an internal combustion engine is provided overcoming, or at least alleviating, at least some of the above-mentioned problems and drawbacks. As a result, the above-mentioned object is achieved.

Optionally, the engine comprises a fuel injector comprising a number of orifices, and wherein each orifice is configured to spray a fuel spray onto a fuel directing surface of the piston. Thereby, an engine is provided capable of directing fuel sprays in an efficient manner so as to avoid merging between fuel sprays and thereby increasing the total stoichiometric surface area of the fuel sprays.

Optionally, a centre axis of the piston extends through the fuel injector. Thereby, an engine is provided capable of directing fuel sprays into a combustion chamber in a uniform and well distributed manner while avoiding merging between adjacent fuel sprays. Thereby, conditions are provided for an improved air/fuel mixing rate and thus also an improved combustion heat release. Moreover, conditions are provided for relative short distances between orifices of an injector of the engine and the fuel directing surfaces. Thereby, conditions are provided for reducing the interaction between flames and walls of a combustion chamber, and thus also the heat transfer to walls of a combustion chamber of the engine.

Optionally, the engine is a compression ignition engine. Thereby, a compression ignition engine is provided having conditions for increased total stoichiometric surface area of fuel sprays. Accordingly, a compression ignition engine is provided having conditions for improved fuel efficiency.

According to a third aspect of the invention, the object is achieved by a vehicle comprising an internal combustion engine according to some embodiments of the present disclosure.

Thereby, a vehicle is provided having conditions for improved fuel efficiency. Accordingly, a vehicle is provided overcoming, or at least alleviating, at least some of the above-mentioned problems and drawbacks. As a result, the above-mentioned object is achieved.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which:

FIG. 2 schematically illustrates an internal combustion engine of the vehicle illustrated in FIG. 1, FIG. 3 schematically illustrates a perspective view of a piston of the internal combustion engine illustrated in FIG. 2, FIG. 4 schematically illustrates a fuel directing surface of the piston illustrated in FIG. 3, as seen in a radial direction of the piston, FIG. 5 schematically illustrates a perspective view of fuel sprays obtained when an injector is spraying fuel onto fuel directing surfaces of the piston illustrated in FIG. 3.

DETAILED DESCRIPTION

Aspects of the present invention will now be described more fully. Like numbers refer to like elements throughout. Well-known functions or constructions will not necessarily be described in detail for brevity and/or clarity.

Figure 1:
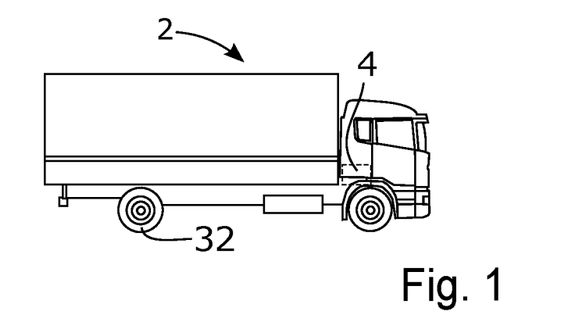
FIG. 1 illustrates a vehicle according to some embodiments.

FIG. 1 illustrates a vehicle 2 according to some embodiments. The vehicle 2 comprises an internal combustion engine 4. The internal combustion engine 4 is configured to provide motive power to the vehicle 2 via wheels 32 of the vehicle 2.

According to the illustrated embodiments, the vehicle 2 is a truck. However, according to further embodiments, the vehicle 2, as referred to herein, may be another type of manned or unmanned vehicle for land or water based propulsion such as a lorry, a bus, a construction vehicle, a tractor, a car, a ship, a boat, or the like.

Figure 2:
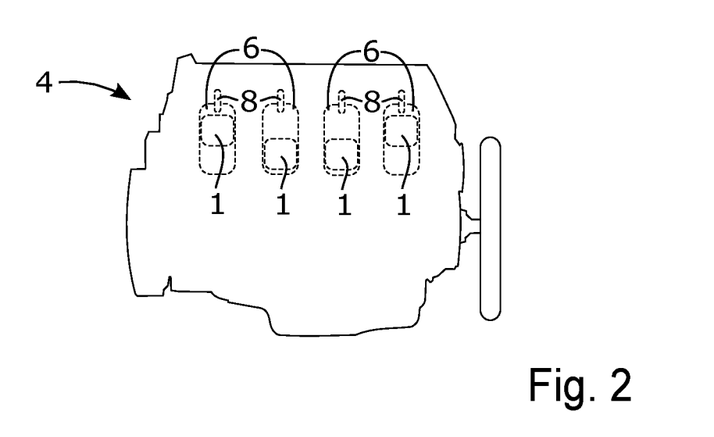

FIG. 2 schematically illustrates the internal combustion engine 4 of the vehicle 2 illustrated in FIG. 1. The internal combustion engine 4 is in some places herein referred to as the "engine 4" for the reason of brevity and clarity. As indicated above, the engine 4 is configured to provide motive power to a vehicle comprising the engine 4. However, according to further embodiments, the engine 4, as referred to herein, may be a stationary engine, such as an engine configured to power a generator for producing electricity. The internal combustion engine 4 comprises a number of pistons 1 each configured to reciprocate in respective cylinder 6 of the internal combustion engine 4. According to the illustrated embodiments, the engine 4 comprises four cylinders 6 and four pistons 1. According to further embodiments, the engine 4 may comprise another number of cylinders 6 and pistons 1.

The internal combustion engine 4 comprises a fuel injector 8 arranged in each cylinder 6. The fuel injectors 8 are configured to inject fuel directly into a cylinder 6 of the internal combustion engine 4. Therefore, the internal combustion engine 4 as referred to herein, may also be referred to as a "direct injection engine". Moreover, according to the illustrated embodiments, the internal combustion engine 4 is a four-stroke engine. Therefore, the internal combustion engine 4 as referred to herein, may also be referred to as a "four-stroke internal combustion engine", "a direct injected four-stroke internal combustion engine", or the like.

Moreover, according to the illustrated embodiments, the internal combustion engine 4 is a diesel engine. According to further embodiments, the internal combustion engine 4, as referred to herein, may be another type of compression ignition engine, or an Otto engine with a spark-ignition device, wherein the Otto engine may be configured to run on gas, petrol, alcohol, similar volatile fuels, or combinations thereof.

Figure 3:
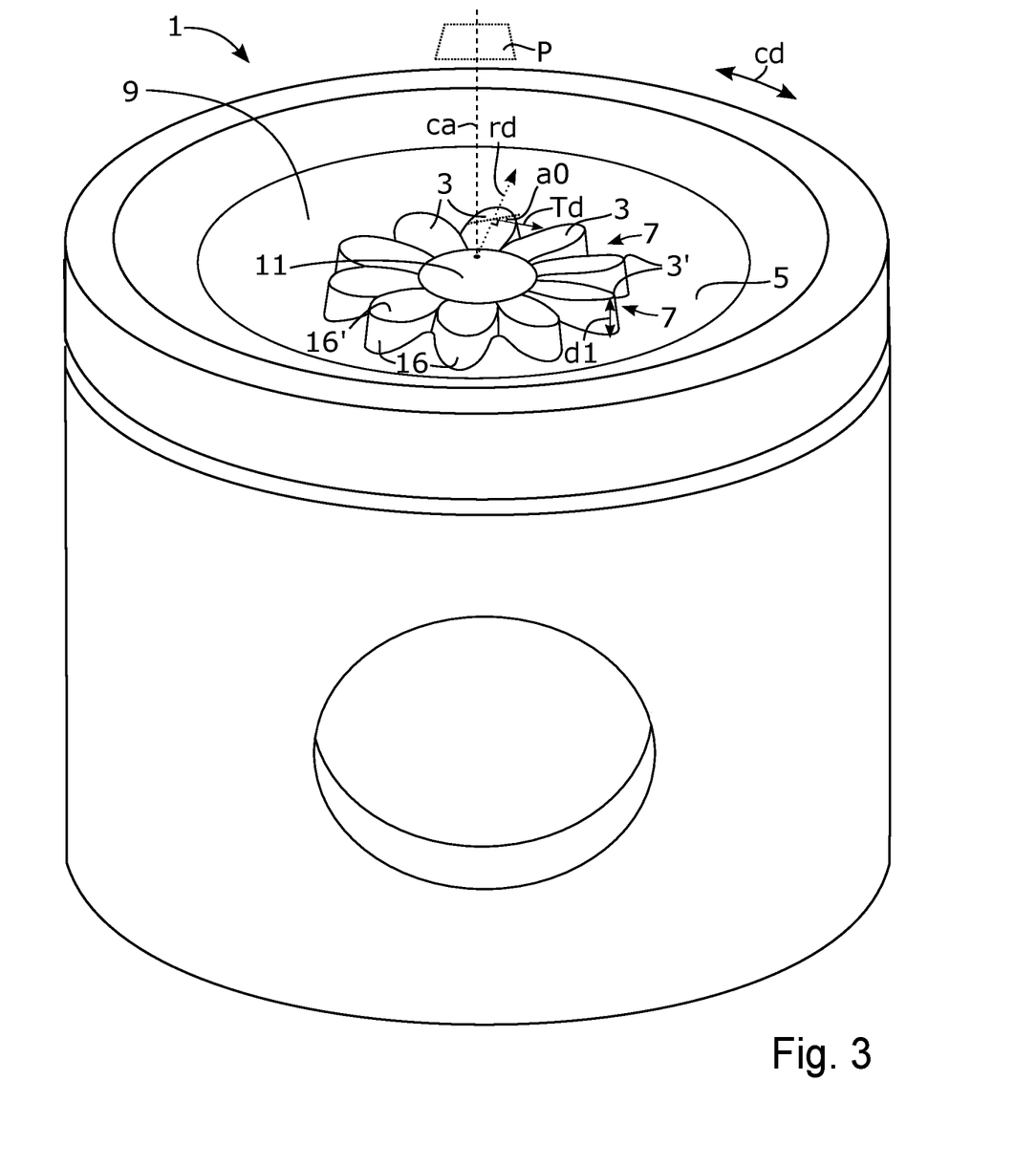

FIG. 3 schematically illustrates a perspective view of a piston 1 of the internal combustion engine 4 illustrated in FIG. 2. The piston 1 is configured to reciprocate along a centre axis ca of the piston 1 during operation in an engine. The centre axis ca of the piston 1 coincides with a centre axis of a cylinder of an engine when the piston 1 is arranged in the cylinder of the engine.

As can be seen in FIG. 3, the piston 1 comprises a number of fuel directing surfaces 3. According to the illustrated embodiments, the fuel directing surfaces 3 are arranged at a distance d1 from a top surface 5 of the piston 1 measured along the centre axis ca. That is, the piston 1 comprises a protruding area 16 protruding from the top surface 5 of the piston 1. The fuel directing surfaces 3 are arranged on a top surface 16' of the protruding area 16. According to further embodiments, the piston 1 may comprise one protrusion 16 per fuel directing surface 3, wherein each fuel directing surfaces 3 is arranged on a top surface 16' of a protrusion 16.

The top surface 5 of the piston 1, as well as the top surface 16' of the protruding area 16, and the fuel directing surfaces 3, face a combustion chamber, and forms a delimiting surface thereof, when the piston 1 is arranged in a cylinder of an engine.

Each fuel directing surface 3 is configured to direct a fuel spray sprayed onto the fuel directing surface 3. Moreover, as is seen in FIG. 3, according to the illustrated embodiments, each fuel directing surface 3 is inclined relative to a tangential direction Td of the piston 1. In this manner, fuel sprays being angled relative to tangential directions Td of the piston 1 are obtained, as is further explained herein. According to some embodiments, one or more of the fuel direction surfaces 3 may be inclined relative to a tangential direction Td of the piston 1. As an example, every other fuel direction surface 3 around a circumferential direction cd of the piston 1 may be inclined relative to a tangential direction Td of the piston 1.

According to the illustrated embodiments, the piston 1 comprises ten fuel directing surfaces 3. However, only some of the fuel directing surfaces 3 in FIG. 3 have been provided with the reference sign "3", for the reason of brevity and clarity. According to further embodiments, the piston 1 may comprise another number of fuel directing surfaces 3, such as a number between four and sixteen. The piston 1 is configured to be combined with a fuel injector having the same number of orifices as the number of fuel directing surfaces 3 such that each orifice is configured to spray a fuel spray onto a fuel directing surface 3 of the piston 1.

According to the illustrated embodiments, the number of fuel directing surfaces 3 are distributed around the centre axis ca of the piston 1. The centre axis ca of the piston 1 may coincide with a centre axis of a fuel injector when the piston 1 is arranged in a cylinder of an engine.

As can be seen in FIG. 3, according to the illustrated embodiments, each fuel directing surface 3 of the number of fuel directing surfaces 3 is inclined relative to a tangential direction Td of the piston 1. Moreover, the fuel directing surfaces 3 are inclined in the same direction relative to tangential directions Td of the piston 1, wherein each tangential direction Td points in the same rotational direction, i.e. in a clockwise or counter-clockwise direction. Furthermore, according to the illustrated embodiments, the number of fuel directing surfaces 3 are provided with the same inclination angle a0 relative to tangential directions Td of the piston 1. However, one or more of the number of fuel directing surfaces 3 may be provided with an inclination angle a0 differing from the other inclination angles a0 of the other fuel directing surfaces 3.

According to the illustrated embodiments, the fuel directing surfaces 3 are arranged such that gaps 7 are formed between pair of adjacent fuel directing surfaces 3. Moreover, as seen in FIG. 3, each fuel directing surface 3 comprises a trailing edge 3', and wherein the gaps 7 are formed in a circumferential direction cd of the piston 1 between trailing edges 3' of two adjacent fuel directing surfaces 3. Thereby, an improved mixing rate is provided between air and fuel because air can flow through the gaps 7 into fuel sprays being directed by the fuel direction surfaces 3. As a result, a piston 1 is provided having conditions for improving the combustion heat release without significantly affecting the heat transfer to walls of a combustion chamber.

According to the illustrated embodiments, the piston 1 comprises a piston bowl 9. As indicated above, according to the illustrated embodiments, the piston 1 is a piston 1 for a compression ignition engine. The number of fuel directing surfaces 3 are arranged in the piston bowl 9. Moreover, according to the illustrated embodiments, the piston 1 comprises a central protrusion 11 protruding from the top surface 5 of the piston 1 at a position between the number of fuel directing surfaces 3. According to the illustrated embodiments, the central protrusion 11 is conical. According to further embodiments, the central protrusion 11 may be frusto-conical. According to the illustrated embodiments, a centre axis of the central protrusion 11 coincides with the centre axis ca of the piston 1.

Figure 4:
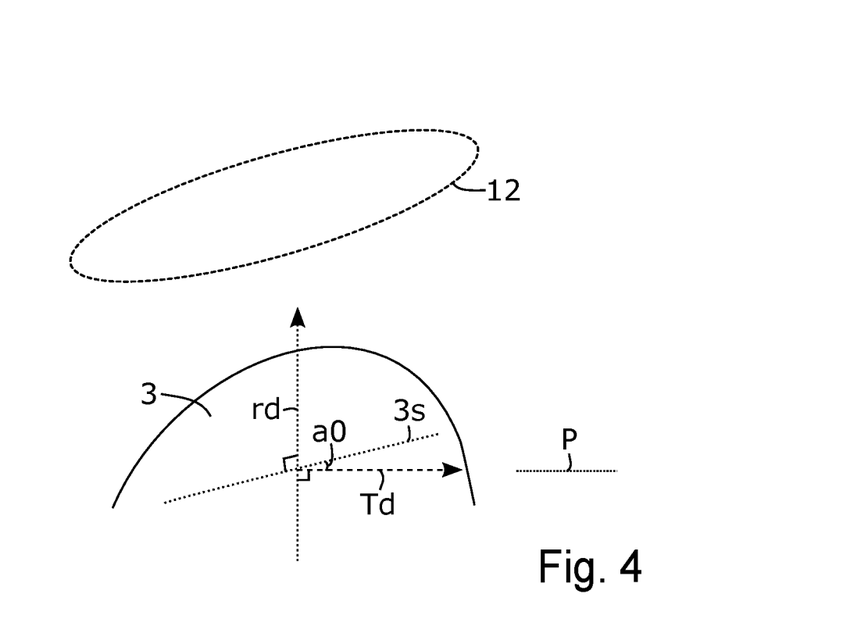

FIG. 4 schematically illustrates a fuel directing surface 3 as seen in a radial direction rd of the piston 1 illustrated in FIG. 3. As indicated in FIG. 3, radial directions rd of the piston 1 crosses the centre axis ca of the piston 1 and are parallel to a plane P perpendicular to the centre axis ca. Accordingly, the radial directions rd of the piston 1 are perpendicular to the centre axis ca of the piston 1.

As indicated in FIG. 3 and FIG. 4, a tangential direction Td of the piston 1 is perpendicular to a radial direction rd of the piston 1 and extends in the plane P perpendicular to the centre axis ca of the piston 1. In FIG. 4, a line 3s is drawn across the fuel directing surface 3. The line 3s is drawn in a direction perpendicular to the radial direction rd of the piston. As clearly seen in FIG. 4, the fuel directing surface 3 is inclined relative to the tangential direction Td of the piston 1. In this manner, a fuel spray 12 being angled relative to the tangential direction Td of the piston is obtained after the fuel spray 12 has been directed by the fuel direction surface 3. In FIG. 4 the cross section of such a fuel spray 12 is schematically indicated in dashed lines.

Normally, somewhat conical fuel sprays are formed in a cylinder when fuel is sprayed freely into a cylinder via orifices of an injector. Conical fuel sprays have a circular cross section in a direction perpendicular to the spraying direction. However, since the fuel directing surface 3 is configured to direct a fuel spray sprayed onto the fuel directing surface 3, more flattened fuel sprays 12 are provided after the impact between the fuel sprays and the respective fuel directing surface 3. As can be seen in FIG. 4, such fuel sprays have a more elliptical cross section in a plane perpendicular to a flow direction, than conical fuel sprays.

According to the illustrated embodiments, the inclination angle a0 between the fuel direction surface 3 and the tangential direction Td of the piston 1 is approximately 14 degrees. According to further embodiments, an inclination angle a0 between at least one fuel direction surface 3 and the tangential direction Td of the piston 1 may be within the range of 1-45 degrees or may be within the range of 7-21 degrees.

As seen in FIG. 4, the fuel direction surface 3 is substantially flat along the line 3s according to the illustrated embodiments. Moreover, according to the illustrated embodiments, the inclination angle a0 between the fuel direction surface 3 and the tangential direction Td of the piston 1 is substantially constant along the radial direction rd of the piston 1. However, according to some embodiments, the fuel direction surface 3 may have a varying inclination angle a0 between the fuel direction surface 3 and the tangential direction Td of the piston 1 along the radial direction rd of the piston 1.

Moreover, according to some embodiments, the fuel direction surface 3 may be curved along a line 3s drawn across the fuel direction surface 3s in a direction perpendicular to the radial direction rd of the piston. Thus, according to such embodiments, the fuel direction surface 3 may have a varying inclination angle a0 between the fuel direction surface 3 and tangential directions Td of the piston along a line 3s drawn across the fuel direction surface 3s in a direction perpendicular to the radial direction rd of the piston. According to such embodiments, the fuel direction surface 3 may have a positive or negative mean inclination angle a0 between the fuel direction surface 3 and tangential directions Td of the piston along the line 3s drawn across the fuel direction surface 3s in a direction perpendicular to the radial direction rd of the piston. In this manner, it can be ensured that an angled fuel spray 12 is obtained after deflection by the fuel directing surface 3.

Figure 5:
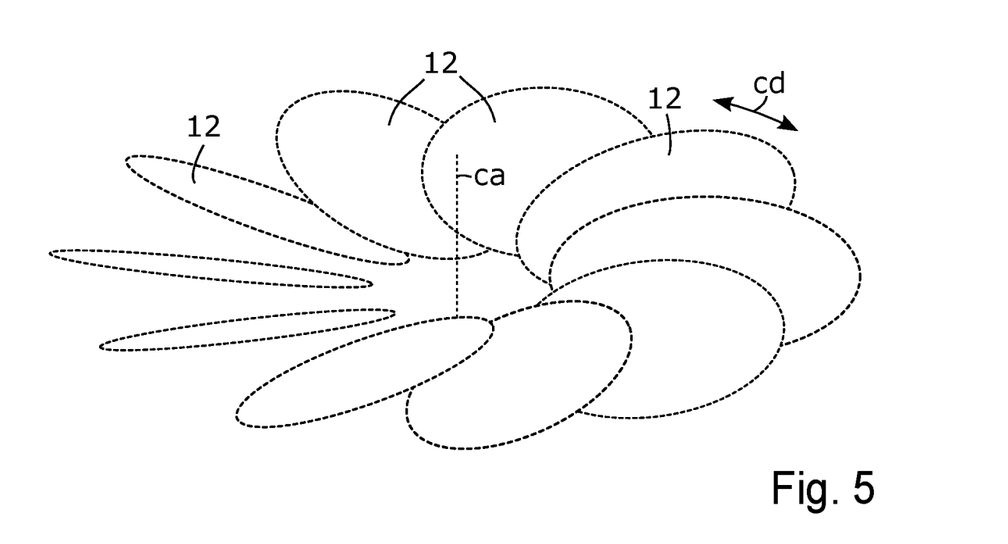

FIG. 5 schematically illustrates a perspective view of fuel sprays 12 obtained when an injector is spraying fuel onto the fuel directing surfaces 3 of the piston 1 illustrated in FIG. 3. As mentioned, and as can be seen in FIG. 3, each fuel directing surface 3 of the number of fuel directing surfaces 3 is inclined relative to a tangential direction Td of the piston 1. Moreover, the fuel directing surfaces 3 are inclined in the same direction relative to tangential directions Td of the piston 1. Furthermore, according to the illustrated embodiments, the number of fuel directing surfaces 3 are provided with the same inclination angle a0 relative to tangential directions Td of the piston 1.

Due to these features, a set of fuel sprays 12 is provided in which the fuel sprays 12 are angled relative to each other in the same direction relative to tangential directions of the piston. Moreover, relatively thin fuel sprays 12 are provided which are stacked one above the other around the circumferential direction cd of a combustion chamber. Thereby, merging and interaction between fuel sprays 12 can be avoided and a great total stoichiometric surface area of fuel sprays 12 can be obtained. As a result thereof, the available space in a combustion chamber is utilized in a more optimal manner so as to provide a great total stoichiometric surface area of fuel sprays 12.

Figure 6:
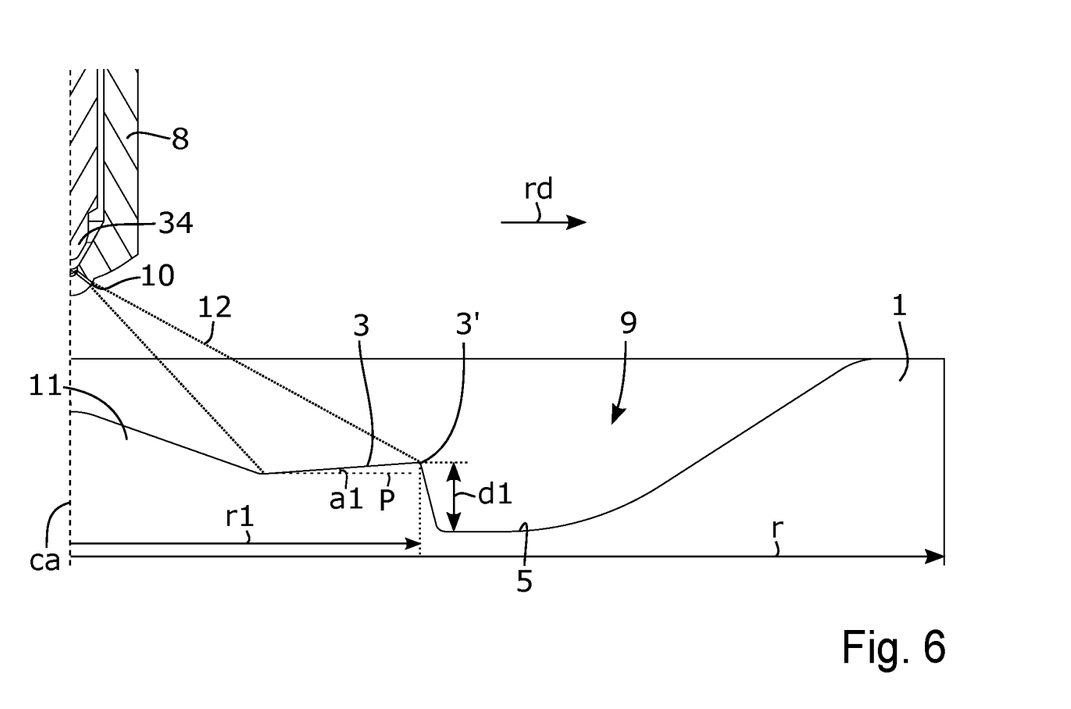
FIG. 6 illustrates a cross section through a portion of a top surface of the piston illustrated in FIG. 3.

FIG. 6 illustrates a cross section through a portion of the top surface 5 of the piston 1 illustrated in FIG. 3. Moreover, in FIG. 6, a cross section of a fuel injector 8 is schematically illustrated. In FIG. 6, the cross section is made in a plane comprising the centre axis ca of the piston 1. The fuel injector 8 is arranged such that a centre axis thereof coincides with the centre axis ca of the piston 1. In other words, according to the illustrated embodiments, the centre axis ca of the piston 1 extends through the fuel injector 8. The fuel injector 8 comprises a needle 34 and a number of orifices 10. The position of the needle 34 controls the flow of fuel trough the orifices 10. In FIG. 6, only one orifice 10 is seen. However, as mentioned above, the fuel injector 8 may comprise the same number of orifices 10 as the number of fuel directing surfaces 3 of the piston 1. Each orifice 10 is configured to spray a fuel spray 12 onto a fuel directing surface 3 of the piston 1. In FIG. 6, such a fuel spray 12 is schematically illustrated.

According to the illustrated embodiments, the fuel directing surfaces 3 are inclined relative to a radial direction rd of the piston 1. In more detail, according to the illustrated embodiments, the fuel directing surfaces 3 are inclined with a positive pitch angle a1 relative to the radial direction rd of the piston 1. The definition "positive pitch angle a1", as used herein, is an angle a1 the fuel directing surfaces 3 causing a distance between the fuel direction surface 3 and the top surface 5 of the piston 1, adjacent to the fuel directing surface 3, to increase along the fuel directing surface 3, seen in a radial direction r of the piston 1 pointing in a directing from the centre axis ca of the piston 1.

According to the illustrated embodiments, the positive pitch angle a1 is approximately 5 degrees. According to further embodiments, the positive pitch angle a1 may be within the range of 1 degrees to 14 degrees or may be within the range of 4 degrees to 7 degrees. In this manner, the fuel of the fuel spray 12 impacting a fuel directing surface 3 can bounce against the fuel directing surface 3 into a direction reducing the interaction between the flame and walls of a combustion chamber. Thereby, the heat transfer to walls of a combustion chamber can be further reduced. According to still further embodiments, one or more of the fuel directing surfaces 3 may be inclined with a negative pitch angle a1 relative to the radial direction rd of the piston 1.

According to the illustrated embodiments, the distances d1 between trailing edges 3' of the fuel direction surfaces 3 and the top surface 5 of the piston 1 adjacent to the trailing edges 3', measured along the centre axis ca, is approximately 7.5% of the radius r of the piston 1. According to further embodiments, the distances d1 between trailing edges 3' of the fuel direction surfaces 3 and the top surface 5 of the piston 1 adjacent to the trailing edges 3', measured along the centre axis ca, may be within the range of 2%-25% of the radius r of the piston 1 or may be within the range of 4%-11% of the radius r of the piston 1. Thereby, air can be transported in an efficient manner into fuel sprays 12 deflected by the fuel directing surfaces 3 from the area between the top surface 5 of the piston 1 and the trailing edges 3' of the fuel direction surfaces 3.

Moreover, according to the illustrated embodiments, the radial distances r1 from a centre axis ca of the prison 1 to trailing edges 3' of the fuel directing surfaces 3 is approximately 40% of the radius r of the piston 1. According to further embodiments, the radial distances r1 from a centre axis ca of the prison 1 to trailing edges 3' of the fuel directing surfaces 3 may be within the range of 20%-70% of the radius r of the piston 1 or may be within the range of 25%-55% of the radius r of the piston 1.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:
1. A piston for an internal combustion engine,
wherein the piston comprises a number of fuel directing surfaces for directing a fuel spray sprayed onto the fuel directing surface,
and wherein at least one of the fuel direction surfaces is/are inclined in the same direction relative to a tangential direction of the piston and wherein the fuel directing surfaces are inclined with a positive pitch angle relative to a radial direction of the piston.

2. The piston according to claim 1, wherein the fuel directing surfaces are arranged at a distance from a top surface of the piston measured along a centre axis of the piston.

3. The piston according to claim 1, wherein the piston comprises a piston bowl, and wherein the number of fuel directing surfaces are arranged in the piston bowl.

4. The piston according to claim 1, wherein the number of fuel directing surfaces are distributed around a centre axis of the piston.

5. The piston according to claim 1, wherein the piston comprises a central protrusion protruding from a top surface of the piston at a position between the number of fuel direction surfaces.

6. The piston according to claim 5, wherein the central protrusion is conical or frusto-conical.

7. The piston according to claim 1, wherein an inclination angle between at least one fuel direction surface and the tangential direction of the piston is within the range of 1-45 degrees, or is within the range of 7-21 degrees.

8. The piston according to claim 1, wherein each fuel directing surface of the number of fuel directing surfaces is inclined relative to a tangential direction of the piston.

9. The piston according to claim 8, wherein the fuel directing surfaces are inclined in the same direction relative to tangential directions of the piston.

10. The piston according to claim 8, wherein the number of fuel directing surfaces are provided with the same inclination angle relative to tangential directions of the piston.

11. The piston according to claim 1, wherein the radial distances from a centre axis of the prison to trailing edges of the fuel directing surfaces is within the range of 20%-70% of the radius of the piston, or is within the range of 25%-55% of the radius of the piston.

12. The piston according to claim 1, wherein the distances between trailing edges of the fuel direction surfaces and the top surface of the piston adjacent to the trailing edges, measured along the centre axis, is within the range of 2%-25% of the radius of the piston or is within the range of 4%-11% of the radius of the piston.

13. The piston according to claim 1, wherein the piston is a piston for a compression ignition engine.

14. An internal combustion engine comprising:
   a cylinder, and
   a piston according to claim 1,
   wherein the piston is configured to reciprocate in the cylinder.

15. The engine according to claim 14, wherein the engine comprises a fuel injector comprising a number of orifices, and wherein each orifice is configured to spray a fuel spray onto a fuel directing surface of the piston.

16. The engine according to claim 15, wherein a centre axis of the piston extends through the fuel injector.

17. The engine according to claim 14, wherein the engine is a compression ignition engine.

18. A vehicle comprising an internal combustion engine according to claim 14.

* * * * *